Reissued Jan. 16, 1940

Re. 21,322

UNITED STATES PATENT OFFICE 21,322

INTERFACE MODIFYING AGENTS AND METHOD OF PRODUCING THE SAME

Benjamin R. Harris, Chicago, Ill., assignor to The Emulsol Corporation, Chicago, Ill., a corporation of Illinois No Drawing. Original No. 2,023,388, dated December 3, 1935, Serial No. 754,087, November 21, 1934. Application for reissue January 7, 1939, Serial No. 249,820

20 Claims. (Cl. 260—411)

My invention relates to new and useful improvements in esters of polyglycerols and method of producing the same. My present invention is a continuation in part of my prior application, Serial No. 697,533, filed November 10, 1933, which in turn is a continuation-in-part of my prior application Serial No. 407,797, filed November 16, 1929, now Patent No. 1,958,700.

The polyglycerol esters of my present invention meet a demand or need for certain materials having in general oleaginous or fatty character and also certain characteristics not ordinarily associated with fats. These characteristics may, in general, be summed up by the term "hydrophilic property". This hydrophilic property, however, is merely a broad generalization, as in different cases the characteristic is identified with the particular object or function desired in a particular art or industry. The polyglycerol esters of my invention, quite apart from any consideration of their structure, possess certain characteristics and properties as emulsification agents and interface modifying substances having valuable uses in many industries, in each case imparting a property or function of a desirable character as will be in part disclosed hereinafter.

Considering the polyglycerol esters of my invention more in detail, such esters possess to varying degrees affinity for oleaginous materials as well as for water, aqueous solutions and aqueous materials in general. The affinity for oleaginous materials is imparted to the esters principally by the presence of a lipophile acyl group or groups which impart to the molecule the tendency to dissolve or to disperse in oleaginous media; or at any rate a certain attraction for oleaginous materials. The hydroxy group or groups tend to impart to these esters a capacity, to varying degrees, to dissolve or disperse in water or aqueous media in general or at least to have a certain attraction for water and aqueous materials. On the relative potencies of the lipophile and hydrophile portions of a given molecule, the resultant activity of the molecule as a whole depends. These potencies are a function not only of the mass and number of groups constituting these relative portions of the molecules, but also on their structural orientation.

My polyglycerides may at will be prepared to be predominantly lipophile or predominantly hydrophile or balanced in the sense set out in great detail in U. S. Patents Nos. 1,917,250, 1,917,256, 1,917,249, and 1,917,257, in which event they manifest certain unique interfacial activities, such as the reduction of spattering of margarine during frying by virtue of their antispattering powers. The three arbitrary examples indicated hereinbelow and designated respectively as "A," "B," and "C" will help to explain one phase of the relative characteristics and behavior of my esters.

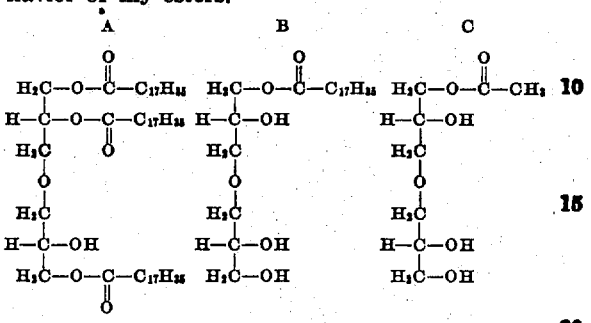

In this set of examples, "A" is predominantly lipophile, "C" is predominantly hydrophile, and "B" is intermediate and by virtue thereof possesses certain interfacial modifying properties not possessed at all by either "A" or "C" or not to anything like the same extent they are manifested by "B". "C" is distinctly water soluble, "A" is distinctly fat soluble, while "B" is intermediate. All three, however, by virtue of the fact that in each of the three molecules there is present both a lipophile and a hydrophile portion, have marked affinities for both oleaginous and aqueous media. Insofar as interface modification in relation to emulsification is concerned, those of my esters which are predominantly lipophile tend to favor the water-in-oil type of emulsion, whereas those which are predominantly hydrophile tend to favor the oil-in-water type of emulsion.

The polyglycerol esters described in my copending application, Serial No. 697,533, above referred to, in general possess the characteristics and exhibit the functions touched on briefly in the preceding paragraphs. Since in general, the methods I employed in my prior application involve the re-esterification of an oil or fat with a polyglycerol, the resulting polyglycerol esters, generally speaking, also included a proportion of glycerol esters. The process and modifications thereof which I describe herein produce esters having a number of important advantages over those I have described heretofore with respect to color, odor, taste and other desirable properties, and are further differentiated from my prior disclosed esters in that they are free of glycerol esters, as a result of which in general they have a higher potency.

The esters I describe herein have free hydroxy groups—at least one free hydroxy group per molecule—which impart hydrophilic properties to a molecule which otherwise would be lipophile in character by virtue of the lipophile group or groups esterified with the polyglycerol. Many of my esters are potent antispatterers, others have wetting-out, penetrating and emulsifying properties, and all of them manifest activity at interfaces of varying degrees and in different manners, depending upon the character of the ester and the interface in question. All of them, however, are interface modifiers, particularly for interfaces between aqueous and oleaginous media, or between an aqueous medium and a solid with an adsorbed layer of oil, fat or other oleaginous material.

My principal method for preparing these esters is to polymerize glycerol to a desired molecular magnitude, whether it be diglycerol, triglycerol, tetraglycerol or higher polymerized glycerols or mixtures thereof, by heating glycerol by itself or in the presence of a catalyst, then freeing the polyglycerol or polyglycerol mixture of unpolymerized glycerol, if any be present, and finally esterifying the polyglycerol material, free of glycerol, with a fatty acid or a fatty acid mixture by reacting the two with or without the presence of an esterification catalyst, or alternatively with acyl halides or acid anhydrides in or without the presence of a catalyst or condensing agent.

These three principal steps, as well as certain other ones, in the preparation of my esters, are described in the illustrative examples given hereinbelow.

The following examples, 1 to 6, describe the preparation of polyglycerol mixtures.

*Example 1*

500 pounds of chemically pure 94% glycerol, in which are dissolved 5 pounds of caustic soda, are heated at approximately 260° C., after initially boiling off the original water content, for 4½ hours with vigorous aspiration of $CO_2$ over the surface at atmospheric pressure and with continuous mechanical stirring. The carbon dioxide gas minimizes oxidation and assists in carrying off moisture. Finally the product is cooled in an atmosphere of carbon dioxide. The resulting polyglycerol product is a rather thick liquid of dark amber color and moderately caramelized odor and taste, with a mean molecular weight varying approximately between 148 and 163, while the molecular weight of an acyclic diglycerol is 166.

*Example 2*

3 parts of flaked sodium hydroxide are dissolved in 300 parts of 94% chemically pure glycerol. This solution is heated for nine hours under reflux in vacuo with a vigorous stream of nitrogen continually bubbling through the liquid. The nitrogen performs the function of stirring and assists in sweeping away water vapor. Heating is commenced, and after the initial moisture present has been boiled off, the temperature of the mixture is raised to approximately 225° C. at a pressure of 160 mm. These conditions are attained by supplying sufficient heat to attain the temperature and applying sufficient vacuum by means of an evacuating jet or a pump, so that despite the supply of nitrogen a desired pressure of 160 mm. of mercury is attained. As the nine hour heating period progresses, the temperature is gradually raised to 240° C. at an approximately uniform rate and the pressure is gradually lowered to 65 mm. also at an approximately even rate, so that at the end of the nine hours the conditions are approximately 240° C. at 65 mm. pressure. The temperature of the reflux condenser is adjusted to allow all moisture to escape and to cause glycerol to reflux back into the reaction mixture. The resulting polyglycerol product, when cooled to room temperature, is very thick, almost solid, extremely dark and strongly caramelized in odor and taste. The mean molecular weight of the product is 326, whereas an acyclic tetraglycerol is 314.

*Example 3*

300 parts of 94% chemically pure glycerol with three parts of caustic soda dissolved therein are heated for seven hours at atmospheric pressure at a temperature of 225° to 230° C., under reflux. Carbon dioxide is kept bubbling through the liquid and the reflux condenser is maintained at a temperature of about 100° C. The product, when cooled to room temperature, is a practically odorless, viscous syrup with a very pale straw color. Its mean molecular weight is 166.

*Example 4*

500 pounds of 94% C. P. glycerol with 5 pounds of caustic soda dissolved therein are heated in vacuum under reflux until the initial moisture content is substantially distilled out. The temperature is then raised to 200° C. and the pressure adjusted to 127 mm. with $CO_2$ bubbling through the mixture. Heating is continued for eleven hours, the temperature being maintained approximately between 220° and 225° C., and the pressure gradually dropped at an approximately even rate from the initial pressure to 70 mm., $CO_2$ being continually bubbled through the mixture. Moisture, with small proportions of other materials, continues to escape, thereby giving a product, which, when cooled to room temperature, is an extremely viscous syrup of dark amber color but good odor and taste. Its mean molecular weight is 256, while the molecular weight of an acyclic triglycerol is 260.

*Example 5*

3 parts of caustic soda are dissolved in their own weight of water and the solution is then mixed with 300 parts of 94% glycerol, chemically pure grade. Nitrogen is bubbled through the mixture and heat and vacuum are applied, under reflux condenser, until the initial moisture is driven off. The temperature is then raised to 250° C. and heating under reflux with nitrogen bubbling through is continued for two and one quarter hours, manipulating the temperature from approximately 250° to 260° C., and the pressure between approximately 440 mm. and 120 mm., in an upward and downward direction, respectively, as the time interval progresses, more or less as described in the examples hereinabove. Under the hereindescribed rate of altering temperature and pressure, approximately 10% of the glycerol distills over, together with other volatile material, and apparently assists in carrying over moisture. On being allowed to cool, the product presents the appearance of a viscous syrup. It is practically odorless, has a pale straw color and the mean molecular weight is approximately 179.

*Example 6*

400 parts of glycerol with 4 parts of flaked caustic soda dissolved therein are heated under vacuo with $CO_2$ continually bubbling through the mixture for two hours at a progressive pressure of approximately 420 mm. to approximately 40 mm. of mercury, and a progressive temperature of approximately 250 to 260° C. (after boiling off the initial moisture present), the temperatures and pressures being progressively manipulated in the order described hereinabove. On cooling to room temperature, the product is seen to be a straw colored, very viscous syrup, practically free of all odor and taste. Its mean molecular weight is approximately 207.

While in the above examples, polymerization has been carried out with the aid of caustic soda as a catalyst, it is possible to obtain polymerization without the use of catalysts, or when catalysts are employed, substances other than caustic soda may be used; for example, sodium carbonate, sodium bicarbonate, other alkaline carbonates and hydroxides, calcium oxide, magnesium oxide, zinc oxide, trisodium phosphate, sodium tetraborate, sodium acetate and other alkaline and potentially alkaline materials, iodine, zinc chloride and the like. Furthermore, the proportion of caustic soda or other catalyst may be varied.

In general, polymerization proceeds much more slowly and with greater difficulty without than with a catalyst. Much higher temperatures and considerably longer heating periods are required. Indeed, other things being equal, on the average it may take three to four times as long to reach a given degree of polymerization.

Example 7 illustrates a polymerization without a catalyst.

*Example 7*

500 parts of anhydrous glycerol are heated at atmospheric pressure for approximately fifteen hours with carbon dioxide bubbling through the liquid, from an initial temperature of 265° to a final temperature of 305° C., the temperature being gradually raised as the time progresses. Moisture is allowed to escape whereas the glycerol is substantially refluxed back into the mixture. The product is a practically odorless, straw colored liquid with a mean molecular weight of approximately 120. Although this reaction takes place at very high temperatures and for such a long period of time as fifteen hours, only about 30% of polyglycerols are formed, based upon the original starting material.

The following examples, 8 to 11, inclusive, indicate procedures for the treatment of polyglycerol mixtures to free them of unpolymerized glycerol.

*Example 8*

The polyglycerol mixture obtained in Example 1 is distilled in high vacuum under a pressure of about 2 mm. of mercury with a small stream of $CO_2$ bubbling through the liquid, the temperature of the liquid being maintained at about 220 to 225° C. until no more glycerol comes off. The product is a heavy, viscous syrup of dark amber color and caramelized odor.

*Example 9*

The polyglycerol mixture obtained in Example 3 is distilled in vacuum at a pressure of 2 to 5 mm. of mercury, the temperature of the liquid being gradually raised to approximately 235° C. and maintained at this point until no more glycerol distills over. A slow stream of nitrogen is kept circulating through the liquid during the distillation. The product, after cooling, is a viscous liquid with a straw color and good odor; in fact, it is practically odorless.

*Example 10*

The polyglycerol mixture obtained in Example 5 is distilled in vacuum at a pressure of approximately 4 mm. of mercury, the temperature of the liquid being gradually raised to approximately 250 to 255° C., and then maintained in this range until glycerol ceases to distill over. Distillation is stopped at this point. On cooling, the product is seen to be extremely viscous, almost a glass, at room temperature. Its color is light amber and it is practically odorless and tasteless.

*Example 11*

The polyglycerol mixture prepared as in Example 7 is distilled in vacuum at approximately 25 mm. pressure and 240° C. until no more glycerol comes over. The residue of the distillation is a viscous liquid mixture of polyglycerols with slightly caramelized odor and of slightly darkened amber color.

Polyglycerol products may be treated to modify or remove the catalyst present or they may be improved, especially as to their odor and taste, by various procedures, particularly by steaming at atmospheric pressure or under reduced pressure with saturated or superheated steam. An illustration of this kind of treatment is as follows:

*Example 12*

The polyglycerol mixture obtained in Example 1 is steam distilled at a pressure of approximately 50 to 20 mm. of mercury and in a temperature range of 180 to 200° C. for a period of two hours, using approximately one part of steam by weight to one part of polyglycerol material. The resultant product is practically entirely free of caramelized odor and taste. In other respects, it has the same properties as the product of Example 1.

In preparing the esters of polyglycerols, my preferred method is to heat the polyglycerol material with a fatty acid or a fatty acid mixture in a proportion insufficient to esterify all of the hydroxy groups present, at atmospheric pressures or super-atmospheric pressures, or in vacuo or in vacuo under reflux, but in any case under conditions which permit the escape of the water formed during the reaction, and preferably under conditions which are non-oxidizing.

Examples 13 to 17, inclusive, will serve to illustrate procedures for the preparation of my fatty acid esters.

*Example 13*

260 parts of the product prepared in Example 8, 141 parts of bleached and deodorized oleic acid and 141 parts of triple pressed saponified stearic acid are heated with stirring, in an atmosphere of $CO_2$ at 220 to 230° C., until the free fatty acid content of the mixture is less than one-half of one percent. The duration of heating under these conditions is approximately one and one-half hours. Moisture is allowed to escape during the reaction. The product of this esterification is a mixture of polyglycerol esters with free hydroxy groups. It is light brown in color, free of objectionable odor and of a pasty consistency at room temperature, and has pronounced anti-spattering power when added in proportions of approximately 1% or less to the usual margarine comprising cultured milk and oleaginous materials.

*Example 14*

450 parts of triple pressed stearic acid with a titer of about 56° C. are heated with 485 parts of the polyglycerol mixture prepared in Example 8. The mixture is stirred for two hours at from 220° to 230° C. by bubbling a stream of carbon dioxide through the liquid. The mixture is then allowed to remain at rest and cooled in an atmosphere of $CO_2$. A small amount of unreacted polyglycerol settles out and is separated from the esters. The esters show a free fatty acid content of .3%, are free of undesirable odors and taste and have a pale buff color after being allowed to solidify and cool to room temperature. The product is friable, but not very hard, and is very potent with regard to the reduction of spattering of margarine during frying.

*Example 15*

500 parts of the product obtained in Example 14 and 260 parts of triple pressed stearic acid are heated with stirring, in a non-oxidizing atmosphere at a temperature of approximately 240 to 250° C. for two and one-quarter hours, the moisture of the reaction being permitted to escape. The product is a brittle buff colored solid with a free fatty acid content of approximately one-half of one percent.

*Example 16*

69 parts of polyglycerol product prepared in Example 10 are heated with 60 parts of a deodorized fatty acid mixture prepared from a cottonseed oil hydrogenated to an iodine value of approximately 45, under vacuum, at a pressure of about 35 to 50 mm. with nitrogen bubbling through the mixture, for about two and one-quarter hours at a temperature of approximately 205° C. The product is a mixture of polyglycerol esters with free hydroxy groups, of good color, odor and taste, with a free fatty acid content of about .3%, and with marked antispattering power.

*Example 17*

90 parts of the polyglycerol mixture prepared as in Example 11, are heated with 145 parts of United States Pharmacopoeia oleic acid of good color and odor, at approximately 225° C. with a vigorous stream of carbon dioxide bubbling through the mixture until the product shows less than ½ of 1% of free fatty acid. This condition is reached in approximately one and one-half hours. The reaction mixture is allowed to cool in a stream of carbon dioxide. The product is a very heavy viscous liquid mixture of polyglycerol esters with free hydroxy groups. Its color is light brown and it has marked hydrophilic properties, with considerable power to reduce the spattering of margarine during frying.

Of the above examples, 13 to 17, it will be noted that in Example 15 approximately two molecules of fatty acids on the average have been esterified with one molecule of polyglycerol, whereas in the other examples on the average only one molecule of fatty acid has been esterified with one molecule of polyglycerol. This ratio may be even further varied, depending upon the product desired. In all cases, useful esters will be obtained as long as at least one hydroxy group remains unesterified.

In addition to the fatty acids employed in Examples 13 to 17, other mono-basic acids of edible or inedible, technical grade, may be employed to give useful hydrophilic esters of polyglycerols. Either single organic acids or mixtures of carboxylic or sulphonic acids may be employed. Any of the fatty acids obtainable by saponification or hydrolysis of animal or vegetable oils, fats or waxes, or hydrogenation products thereof, are suitable for the purposes of my invention. Examples of single fatty acids are acetic, propionic, butyric, valeric, caprylic, caproic, capric, lauric, myristic, palmitic, stearic, oleic, ricinoleic, hydroxystearic, behenic, linoleic, linolenic, naphthenic acids, benzenesulphonic, naphthalene-sulphonic, and other aromatic sulphonic acids, cetylsulphonic, dodecylsulphonic, benzoic acid, naphthoic acid, and other aromatic mono-carboxylic acids, etc. Examples of oils and fats and other materials from which satisfactory mixtures of the carboxylic acids may be derived are as follows: coconut, palm kernel, tallow, oleo oil, oleostearine, cottonseed, palm, soy, corn, sunflower, sesame, linseed, whale, fish oils, lard, rosin, and hydrogenation products thereof.

In instances where my polyglycerol esters are to be employed for food purposes, as for example in improving an oleomargarine or a shortening or a cake batter, I employ fatty acid materials and glycerol of food grade. In other cases, where the ester is to be used for technical or industrial purposes, lower grades of fatty acid materials and cheaper grades of glycerol may be employed.

While my present invention includes the preparation of relatively pure substances having decided advantages for certain purposes, it should be remembered that for many purposes, mixtures are more potent and produce better results than the relatively pure substances. For this reason, I prefer often to use a mixture of fatty acids for esterification with the polyglycerols rather than a relative pure fatty acid product such as stearic acid, for example. Mixed fatty acids derived from many of the ordinary oils and fats can, therefore, be used with very good results, in many cases. In any case, my present substance may be made free of glycerides. These substances also are free of glycerine, and therefore have a much lower smoking point than substances including small amounts of glycerine.

In general, my polyglycerol esters, with respect to their consistency and other purely physical characteristics, are parallel to the fatty acids or mixture of fatty acids from which they are prepared; that is to say, a polyglycerol ester made from a liquid fatty acid is normally liquid at room temperature, one made from a solid fatty acid or mixture of solid fatty acids is solid at room temperature. This does not mean, however, that the physical characteristics of the esters are identical with those of the acids from which they are prepared. In fact, in general the ester is somewhat softer in the case of solid ones, and in the case of liquid ones somewhat more viscous and syrupy than the liquid fatty acids from which they are prepared. The colors of my esters depend largely on the color of the polyglycerol mixture, in the sense that a dark colored polyglycerol mixture will produce a dark colored ester, irrespective of how good the color of the fatty material may be. It is, therefore, advantageous in general to use polyglycerol products of good color, methods for the preparation of which have been fully described herein.

Some of the improvements in the methods I employ in accordance with my present application result from the improved manner of preparing the initial polyglycerols. Inasmuch as many features of the method of preparing the polyglycerols are new, my invention is also directed to the sub-combination of steps involved in preparing the polyglycerols.

What I claim as new and desire to protect by Reissue Letters Patent of the United States is:

1. An interface modifying agent comprising an ester of polyglycerol and a relatively high molecular weight monobasic aliphatic acid containing less than 18 carbon atoms, said ester having at least one free hydroxy group.

2. An interface modifying agent comprising esters of mixed polyglycerols and a relatively high molecular weight monobasic aliphatic organic acid containing less than 18 carbon atoms, said esters having at least one free hydroxy group.

3. An interface modifying agent comprising esters of mixed polyglycerols and mixed relatively high molecular weight mono-basic aliphatic organic acids, said esters having at least one free hydroxy group.

4. An interface modifying agent comprising an ester of a polyglycerol and a relatively high molecular weight monobasic aliphatic carboxylic acid containing less than 18 carbon atoms, said ester having at least one free hydroxy group.

5. An interface modifying agent comprising esters of mixed polyglycerols and a relatively high molecular weight monobasic aliphatic carboxylic acid containing less than 18 carbon atoms, said esters having at least one free hydroxy group.

6. An interface modifying agent comprising esters of mixed polyglycerols and mixed relatively high molecular weight mono-basic aliphatic carboxylic acids, said esters having at least one hydroxy group.

7. An interface modifying agent in the form of an ester of an aliphatic monobasic acid containing less than 18 carbon atoms and a polyglycerol, said ester having at least one free hydroxy group.

8. An interface modifying agent in the form of an ester of a monobasic aliphatic carboxylic acid containing less than 18 carbon atoms and a polyglycerol, said ester having at least one free hydroxy group.

9. The method of producing an interface modifying agent in the form of an ester of polyglycerol, which ester has at least one free hydroxy group, which comprises esterifying the polyglycerol with a fatty acid containing less than 18 carbon atoms.

10. The method of producing an interface modifying agent in the form of an ester of polyglycerol, which ester has at least one free hydroxy group, which comprises polymerizing glycerine, heating the polymerized product under reduced pressure to distill off unreacted glycerine, and esterifying the glycerine free product with a fatty acid.

11. The method of producing an interface modifying agent in the form of an ester of polyglycerol, which ester has at least one free hydroxy group, which comprises, esterifying the polyglycerol with a mixture of fatty acids.

12. The method of producing an interface modifying agent in the form of an ester of polyglycerol, which ester has at least one free hydroxy group, which comprises polymerizing glycerine, heating the polymerized product under reduced pressure to distill off unreacted glycerine, and esterifying the glycerine free product with a mixture of fatty acids.

13. An interface modifying agent, having a liquid to plastic consistency at room temperature, comprising an ester of a polyglycerol and a relatively high molecular weight unsaturated fatty acid, said ester containing at least one free polyglycerol hydroxy group.

14. An interface modifying agent, having a liquid to plastic consistency at room temperature, comprising esters of polyglycerols with higher molecular weight unsaturated fatty acids derived from a member of the group consisting of triglyceride oils and fats and mixtures thereof, said esters having at least one free polyglycerol hydroxy group.

15. An interface modifying agent, having a liquid to plastic consistency at room temperature, comprising esters of polyglycerols with mixed relatively high molecular weight fatty acids at least part of which are unsaturated, said esters having at least one free polyglycerol hydroxy group.

16. Interface modifying agents in the form of esters of polyglycerol with a higher fatty acid containing at least a substantial content of oleic acid, said esters having at least one free polyglycerol hydroxy group.

17. An interface modifying agent comprising an ester of a polyglycerol and a monobasic aliphatic acid containing more than 18 carbon atoms, said ester having at least one free polyglycerol hydroxy group.

18. The method of producing interface modifying agents in the form of esters of polyglycerols having at least one free polyglycerol hydroxy group which comprises polymerizing glycerin in a non-oxidizing atmosphere and partially esterifying the polymerized glycerin with a fatty acid.

19. The method of producing interface modifying agents in the form of esters of polyglycerols containing at least one free polyglycerol hydroxy group which comprises heating glycerol at elevated temperatures in an inert atmosphere in the presence of an alkaline reacting catalyst to produce a high content of polyglycerols, and partially esterifying the resulting polygycerols with a higher molecular weight fatty acid.

20. The method of producing interface modifying agents in the form of esters of polyglycerols containing at least one free polyglycerol hydroxy group which comprises heating glycerol at elevated temperatures in an inert atmosphere in the presence of an alkaline reacting catalyst to produce a high content of polyglycerols, heating the polymerized product under reduced pressure to distill off unreacted glycerin, and partially esterifying the substantially glycerin free product with a fatty acid.

BENJAMIN R. HARRIS.